United States Patent
Wu et al.

(10) Patent No.: US 9,609,716 B2
(45) Date of Patent: Mar. 28, 2017

(54) UNDERVOLTAGE PROTECTION CIRCUIT FOR LED LAMP

(71) Applicant: Wanjiong Lin, Ningbo (CN)

(72) Inventors: Qizhi Wu, Ningbo (CN); Wen Ying, Ningbo (CN); Junjun Ying, Ningbo (CN); Wanjiong Lin, Ningbo (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 14/498,752

(22) Filed: Sep. 26, 2014

(65) Prior Publication Data

US 2015/0091469 A1    Apr. 2, 2015

(30) Foreign Application Priority Data

Sep. 29, 2013  (CN) .......................... 2013 1 0480304

(51) Int. Cl.
  *H05B 33/08*  (2006.01)
  *H02H 3/24*  (2006.01)

(52) U.S. Cl.
  CPC ........... *H05B 33/089* (2013.01); *H02H 3/243* (2013.01); *H05B 33/0815* (2013.01); *H05B 33/0818* (2013.01); *Y02B 20/341* (2013.01)

(58) Field of Classification Search
  None
  See application file for complete search history.

(56) References Cited

U.S. PATENT DOCUMENTS

| | | | |
|---|---|---|---|
| 5,382,893 A * | 1/1995 | Dehnel ................... | H02J 7/008 307/66 |
| 7,253,997 B2 * | 8/2007 | Balakrishnan .... | H02M 3/33507 361/18 |

(Continued)

FOREIGN PATENT DOCUMENTS

CN            103151910        *  6/2013       ............. H02M 1/32

OTHER PUBLICATIONS

Texas Instruments, TL43xx Precision Programmable Reference, SLVS5430, August 2004.*

(Continued)

*Primary Examiner* — Alexander H Taningco
*Assistant Examiner* — Nelson Correa
(74) *Attorney, Agent, or Firm* — Wang Law Firm, Inc.

(57) ABSTRACT

An undervoltage protection circuit for LED lamp includes a DC/DC converter, and a controlling circuit module. The controlling circuit module includes a signal collecting unit configured for collecting a signal, a signal comparing unit electrically connected to the signal collecting unit, and a signal processing unit electrically connected to the signal comparing unit. The signal comparing unit is configured for comparing a signal input from the signal collecting unit with a threshold voltage. The signal processing unit is configured for processing the signal output of the signal collecting unit to turn on or turn off the DC/DC converter. Whenever the voltage input is less than the threshold voltage which indicates an undervoltage condition, the controlling circuit module produces a high level and causes the DC/DC converter to not work as a result. Inversely, the controlling circuit module drops to a low level and the DC/DC converter begins to work.

8 Claims, 8 Drawing Sheets

(56) References Cited

U.S. PATENT DOCUMENTS

| | | | | |
|---|---|---|---|---|
| 8,111,007 | B2* | 2/2012 | Chung | H05B 33/0818 |
| | | | | 315/291 |
| 8,116,045 | B2* | 2/2012 | Young | H02M 3/155 |
| | | | | 361/18 |
| 8,405,321 | B2* | 3/2013 | Omi | H02M 1/36 |
| | | | | 315/291 |
| 8,502,466 | B2* | 8/2013 | Liu | H05B 33/0827 |
| | | | | 315/200 R |
| 2010/0156324 | A1* | 6/2010 | Nagase | H05B 33/089 |
| | | | | 315/307 |
| 2012/0299498 | A1* | 11/2012 | Quaal | H05B 37/0227 |
| | | | | 315/210 |
| 2014/0286058 | A1* | 9/2014 | Xu | H02M 1/32 |
| | | | | 363/21.17 |
| 2014/0320786 | A1* | 10/2014 | Zhang | 349/69 |
| 2014/0333520 | A1* | 11/2014 | Zhang | G09G 3/36 |
| | | | | 345/102 |
| 2015/0156830 | A1* | 6/2015 | Ma | H05B 33/0803 |
| | | | | 315/291 |

OTHER PUBLICATIONS

Analog Integrations Corporation, AIC431/TL431A/TL431 Adjustable Precision Shunt Regulator, Jun. 15, 2012.*

* cited by examiner

UNDERVOLTAGE PROTECTION CIRCUIT FOR LED LAMP

RELATED APPLICATION

This application claims benefit of Chinese Application CN201310480304.8, filed on Sep. 29, 2013, the specification of which is hereby incorporated in its entirety by reference.

BACKGROUND

1. Technical Field

The disclosure relates to a circuit for protecting an electronic device against malfunctions caused by undervoltage conditions, and more particularly to undervoltage protection circuit for LED lamp.

2. Description of the Related Art

For years, people have used traditional incandescent or fluorescence lighting apparatus in order to address their interior lighting concerns. However, such lighting apparatus presents a number of drawbacks. For example, the popular halogen apparatus present the following drawbacks, such as relatively high power consumption, inefficiency of light dispersion due to the placement of its metal shield in the line sight of the halogen bulb, and its limited effectiveness in preventing glare from the halogen bulb.

Recently, a number of LED lamp have been designed to replace the halogen apparatus, as well as other traditional incandescent or fluorescence lighting apparatuses, which are utilized in some commercial lighting, such as exhibition cabinet, horizontal freezer etc. As well known, the LED lamp must be powered by an appropriate supply, such as constant flow source or constant voltage source. It is important when operating the LED lamp that the supply which powers the device be carefully monitored. In particular, the supply voltage must be maintained within a tolerance range necessary to ensure proper operation of the LED lamp. If the supply voltage deviates outside the tolerance range, then the device may malfunction or, worse yet, may be destroyed. For example, DC/DC converter is generally used in the constant voltage source. However, the DC/DC converter has no 100% duty ratio. In result, there is voltage difference between the input voltage and the output voltage. For example, it is assumed that output voltage of the LED lamp is 18V, and then, the input voltage of the DC/DC converter need to be 24V. As a result, 6V of voltage difference may be formed therebetween. When the DC/DC converter works and the load is full, input voltage will rise from 0V until to 24V. However, while the input voltage rises into 18V, the DC/DC converter begins to work, and now, there is a little voltage difference therebetween and the DC/DC converter has a big duty ratio. As the output voltage rises, the input current of the DC/DC converter will increase and the input current of the supply will increase, which not conform to safety requirement.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
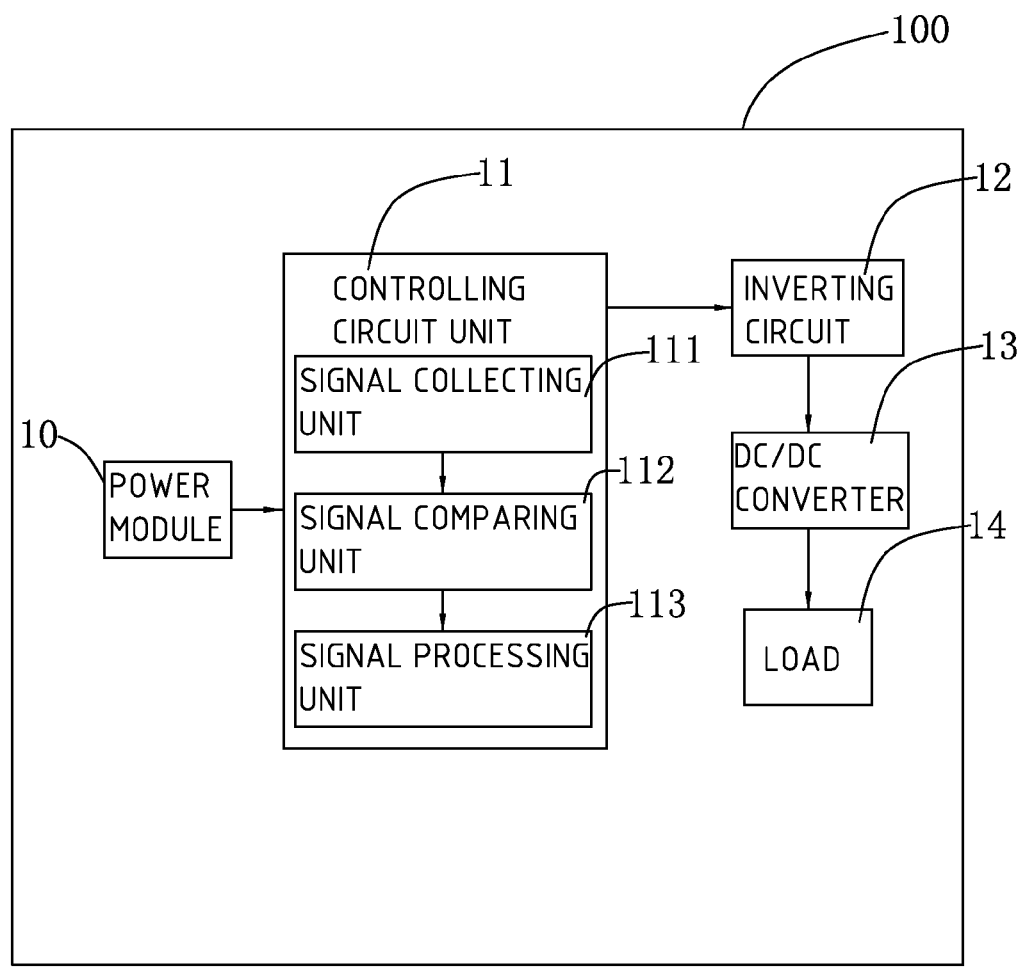
FIG. 1 is a block diagram of an undervoltage protection circuit for an LED lamp according to a first embodiment.
Figure 2:
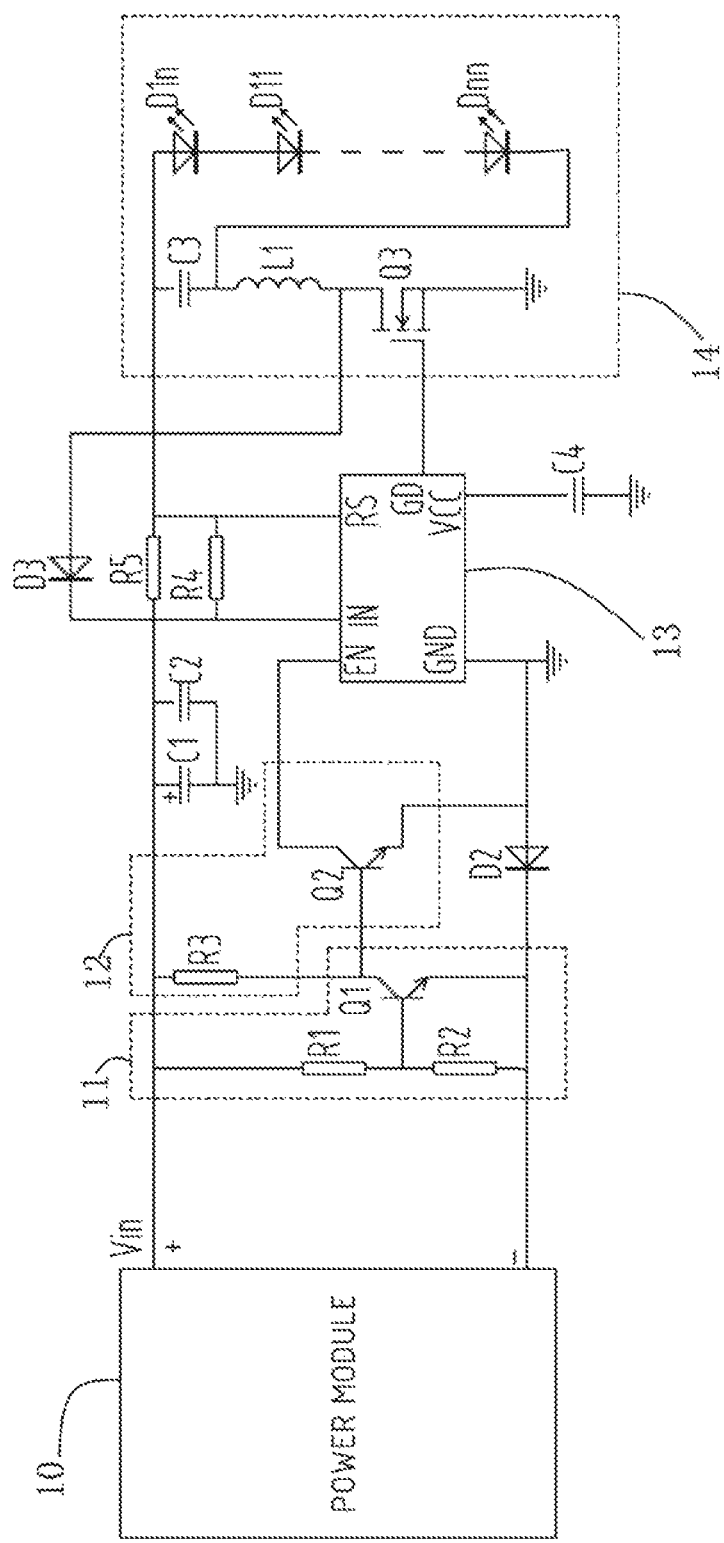
FIG. 2 is a circuit diagram of the undervoltage protection circuit for an LED lamp of FIG. 1.

Referring to FIG. 1 and FIG. 2, a block diagram and a schematic view of an undervoltage protection circuit 100 for LED lamp according to a first embodiment are shown. The undervoltage protection circuit 100 for LED lamp includes a power module 10, a controlling circuit module 11 electrically connected to the power module 10, an invert circuit 12 electrically connected to the controlling circuit module 11, a DC/DC converter 13 electrically connected to the invert circuit 12, and at least a load 14. As well known, the undervoltage protection circuit 100 may include other function module, such as input filter means, rectification means, and so on.

The power module 10 is configured to supply power for the whole circuit and the load 14. When the load 14 is LED (Light Emitting Diode), the output current from the power module 10 need to be direct current having constant value. Therefore, the power module 10 firstly should convert and step down the power from grid into the direct and constant current to match with the load 14.

The controlling circuit module 11 indicated by dashed lines is electrically connected to the DC/DC converter and functions to control the output signal of the power module 10 so as to supply the load 14 with standard direct and constant current and turn off the power module 10 when the current therefrom is not match up the standard direct and constant current. The controlling circuit module 11 includes a signal collecting unit 111, a signal comparing unit 112 electrically connected to the signal collecting unit 111, a signal processing unit 113 electrically connected to the signal comparing unit 112. As shown in FIG. 2, the controlling circuit module 11 includes two resistors R1, R2, and a triode Q1. The resistor R1 is electrically connected in series to the resistor R2. In the present embodiment, the resistors R1, R2 functions as the signal collecting unit 111 and the signal comparing unit 112. As the resistors R1, R2 is electrically arranged in series between the high and low level of the power module 11, voltage value between the resistors R1, R2 can be respectively collected by means of selecting the resistors R1, R2 having different parameters. As the output voltage of the power module 10 raises, voltage value of the resistors R1, R2 will change. The voltage value loaded on the resistors R2 is regarded as a predetermined value and a reference voltage (VREF) which determines switching time of the triode Q1. In the present embodiment, the triode Q1 functions as the signal processing unit 113 which compares the voltage value loaded on the resistors R2 with the value of the base-emitter voltage. The base of the triode Q1 is electrically arranged between the resistors R1 and R2. The collector of the triode Q1 is electrically connected to the EN pin of the DC/DC converter 13. The emitter of the triode Q1 is grounded. As a result, the input voltage of the triode Q1 equal to the voltage loaded on the resistor R2. Whenever the voltage value loaded on the resistor R2 less than that of the base-emitter voltage (VBE), indicating an undervoltage condition, the triode Q1 turns off. On the other hand, whenever the voltage value loaded on the resistor R2 more than that of the base-emitter voltage, the triode Q1 turns on. As a result, the signal processing unit 113, or the triode Q1, processes the collected signal and controls on/off of the DC/DC converter 13. And so, the controlling circuit unit 11 controls on/off the whole circuit.

The inverting circuit 12 indicated by dashed lines is electrically arranged between the DC/DC converter 13 and the controlling circuit unit 11, and is configured for inverting the direction of the current of EN pin of the DC/DC converter 13 so that the current of EN pin of the DC/DC converter has same direction with that of output current of the controlling module. The inverting circuit 12 functions to match the on/off of the DC/DC converter 13 with high/low voltage output of the power module 11. That is to say, whenever the voltage output of the power module 11 is more than the predetermined value, the whole circuit works. Whenever the voltage output of the power module 11 is less than the predetermined value, indicating an undervoltage condition, the whole circuit is closed. The inverting circuit 12 includes a triode Q2. The base of the triode Q2 is electrically connected to the collector of the triode Q1. The emitter of the triode Q2 is grounded. The collector of the triode Q1 is electrically connected to the EN pin of the DC/DC converter 13. As shown in FIG. 2, the triode Q2 is on as the triode Q1 is off. Inversely, the triode Q2 is off as the triode Q1 is on.

The DC/DC converter 13 indicated by dashed lines is a switch power chip and contains several sub-circuits, each with its own voltage level requirement different from that supplied by the battery or an external supply (sometimes higher or lower than the supply voltage). In FIG. 2, whenever the triode Q2 is on, the collector and emitter of the triode Q2 breakover and the EN pin of the DC/DC converter 13 has no output. Conversely, whenever the triode Q2 is off, the collector of the triode Q2 and the EN pin of the do/DC converter 13 produce a relatively high voltage output. As a result, the EN pin of the DC/DC converter 13 has output and the load 14 begins to work.

The load 14 includes one LED lamp or a set of LED lamps D1n, D11, . . . Dnn. As well known for a person skilled in the art, the LED lamp is available acknowledge which need not to be described in detail. The load 14 has a rated operation voltage which is regarded as threshold voltage of the whole circuit.

As described above, when the DC/DC converter 13 is on, input voltage raises from 0V to 24V in which a temporary undervoltage exists. As the voltage output of the power module 10 is less than the threshold voltage of the whole circuit, the controlling circuit module 11 produces a relatively high voltage output, and the triode Q2 of the inverting circuit 12 breakovers. As a result, the EN pin of the DC/DC converter 13 produces a low level and is off. Therefore, the load 14 not works. As the voltage output of the power module 10 raises and is more than the threshold voltage, the controlling circuit module 11 produces a relatively low voltage output and the triode Q2 of the inverting circuit 12 is off. The EN pin of the DC/DC converter 13 has a high level and is on. The load 14 begins to work in result and the safety requirement is conformed to in the whole circuit.

Figure 3:
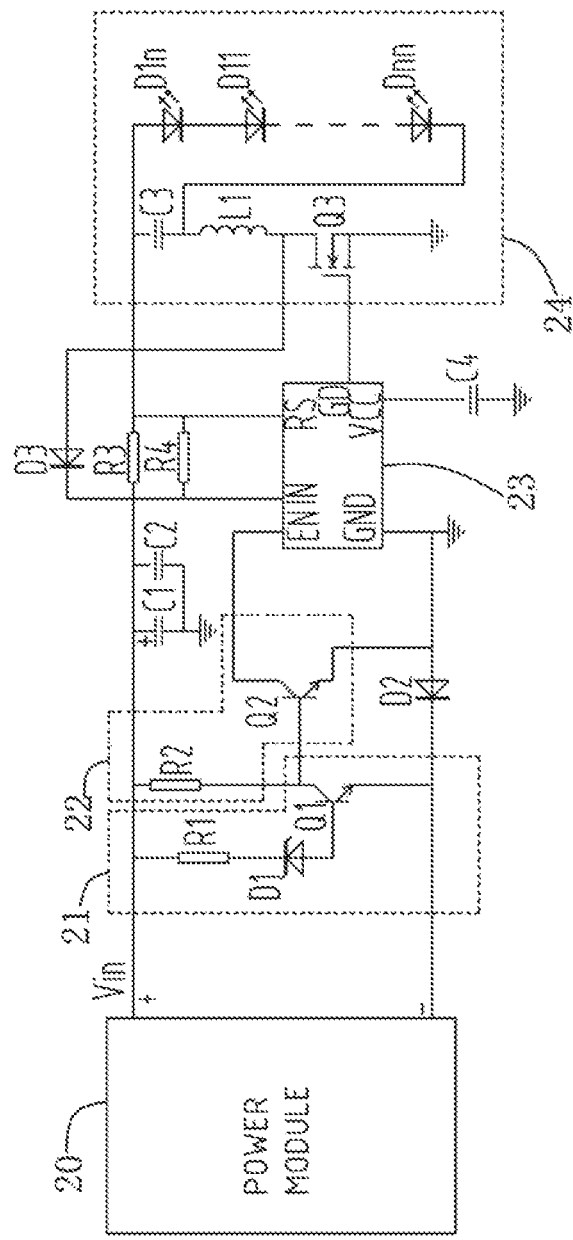
FIG. 3 is a circuit diagram of an undervoltage protection circuit for an LED lamp according to a second embodiment.

In FIG. 3, an undervoltage protection circuit 200 for an LED lamp according to a second embodiment is shown. As presented in the first embodiment, the undervoltage protection 200 includes a power module 20, a controlling circuit module 21 electrically connected to the power module 20, an invert circuit 22 electrically connected to the controlling circuit module 21, a DC/DC converter 23 electrically connected to the invert circuit 22, and at least a load 24. The power module 20, the invert circuit 22, the DC/DC converter 23, and the load 24 have same configuration and principle of operation with that of the first embodiment. The configuration and principle of operation of the controlling circuit module 21 is described in detail as below.

AS shown in FIG. 3, the controlling circuit module 21 includes a voltage-regulator tube D1, and a triode Q1. The voltage-regulator tube D1 functions as both the signal collecting unit and the signal comparing unit. Whenever the voltage output of the power module 20 is less than the breakdown voltage of the voltage-regulator tube D1, the voltage-regulator tube D1 is off. Reversely, the voltage-regulator tube D1 is on. The base of the triode Q1 is electrically connected to the cathode of the voltage-regulator tube D1. The collector of the triode Q1 is electrically connected to the EN pin of the DC/DC converter 23. And the emitter of the triode Q1 is grounded. The triode Q1 functions as the signal processing unit. The base of the triode Q1 drops to a low level and turns off while the voltage-regulator tube D1 is off in which a temporary undervoltage condition exists. Therefore, the triode Q2 of the inverting circuit 22 turns on and the EN pin of the DC/DC converter 23 produces a low level. As a result, the load 14 not works. Conversely, the base of triode Q1 draws to a high level and turns on while the voltage-regulator tube D1 is on in which the whole circuit is normal. The EN pin of the DC/DC converter 23 produces a relatively high voltage output and the load 14 begins to work.

Figure 4:
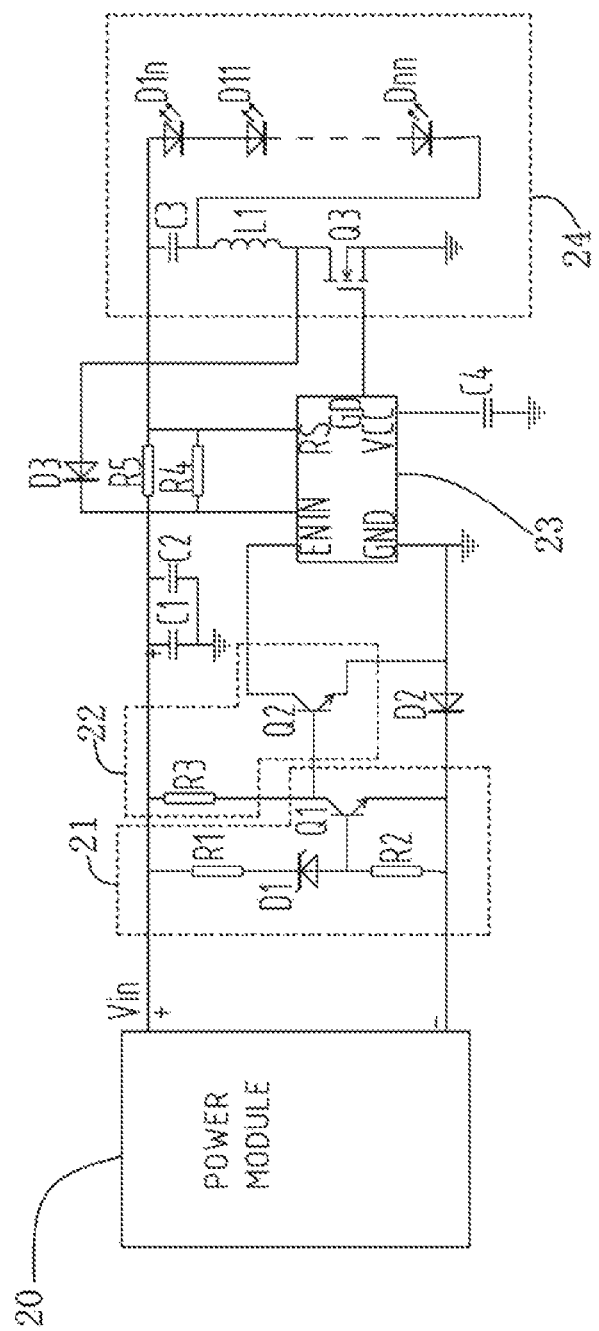
FIG. 4 is a circuit diagram of the undervoltage protection circuit for an LED lamp of FIG. 3 having an additional resistor.

Referring to FIG. 4, the controlling circuit module further includes a resistor R2 on the base of the FIG. 3. The resistor R2 is in series with the voltage-regulator tube D1 and electrically connected to the cathode of the voltage-regulator tube D1. The base of the triode Q1 is electrically arranged between the voltage-regulator tube D1 and the resistor R2. The resistor R2 functions as a pull-down bias resistor and is configured for regulating the triode Q1 to prevent the triode Q1 from interfering.

Figure 5:
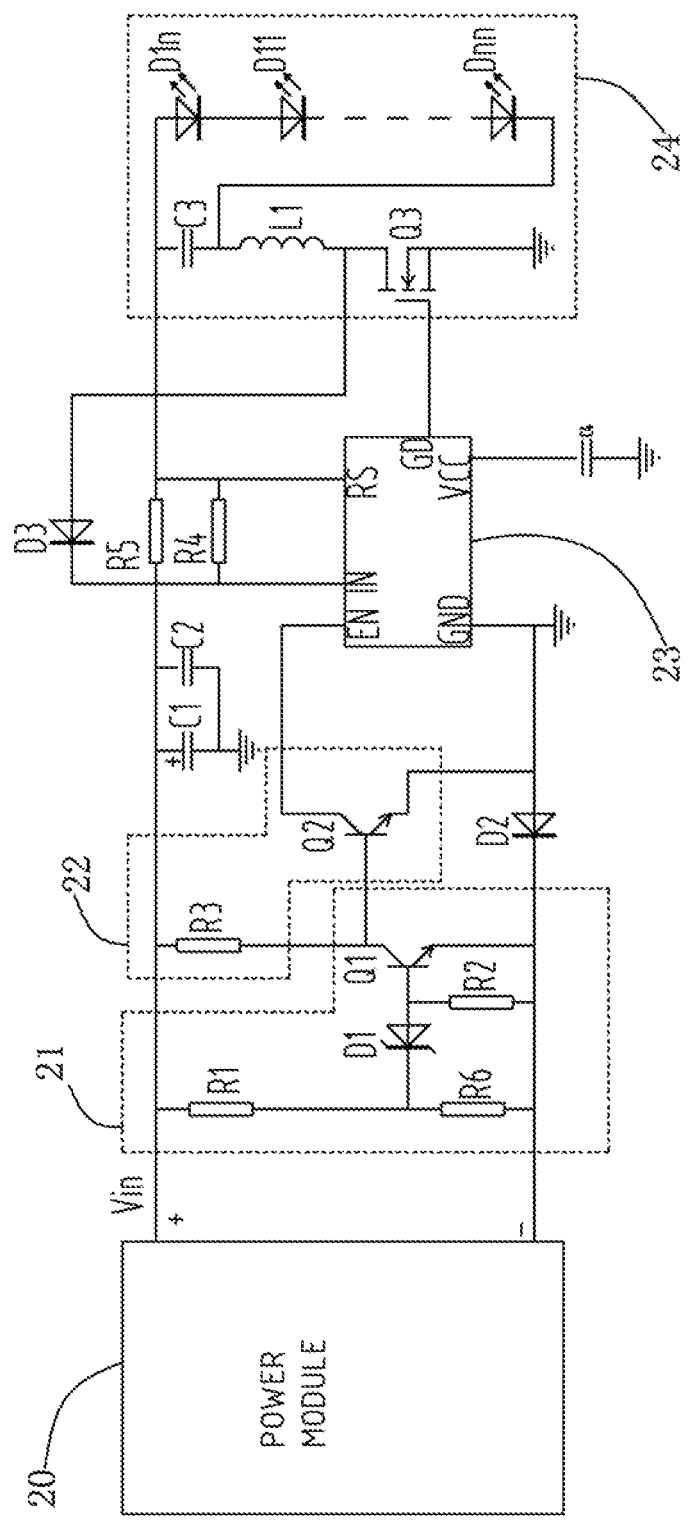
FIG. 5 is a circuit diagram of the undervoltage protection circuit for an LED lamp of FIG. 4 having another resistor.

Referring to FIG. 5, the controlling circuit module further includes another resistor R6 on the base of the FIG. 4. The resistor R6 is in parallel with the voltage-regulator tube D1 and the resistor R2. The resistor R6 is configured to reduce the thermal drift phenomenon of the voltage-regulator tube D1 and improve the stability of the whole circuit.

Figure 6:
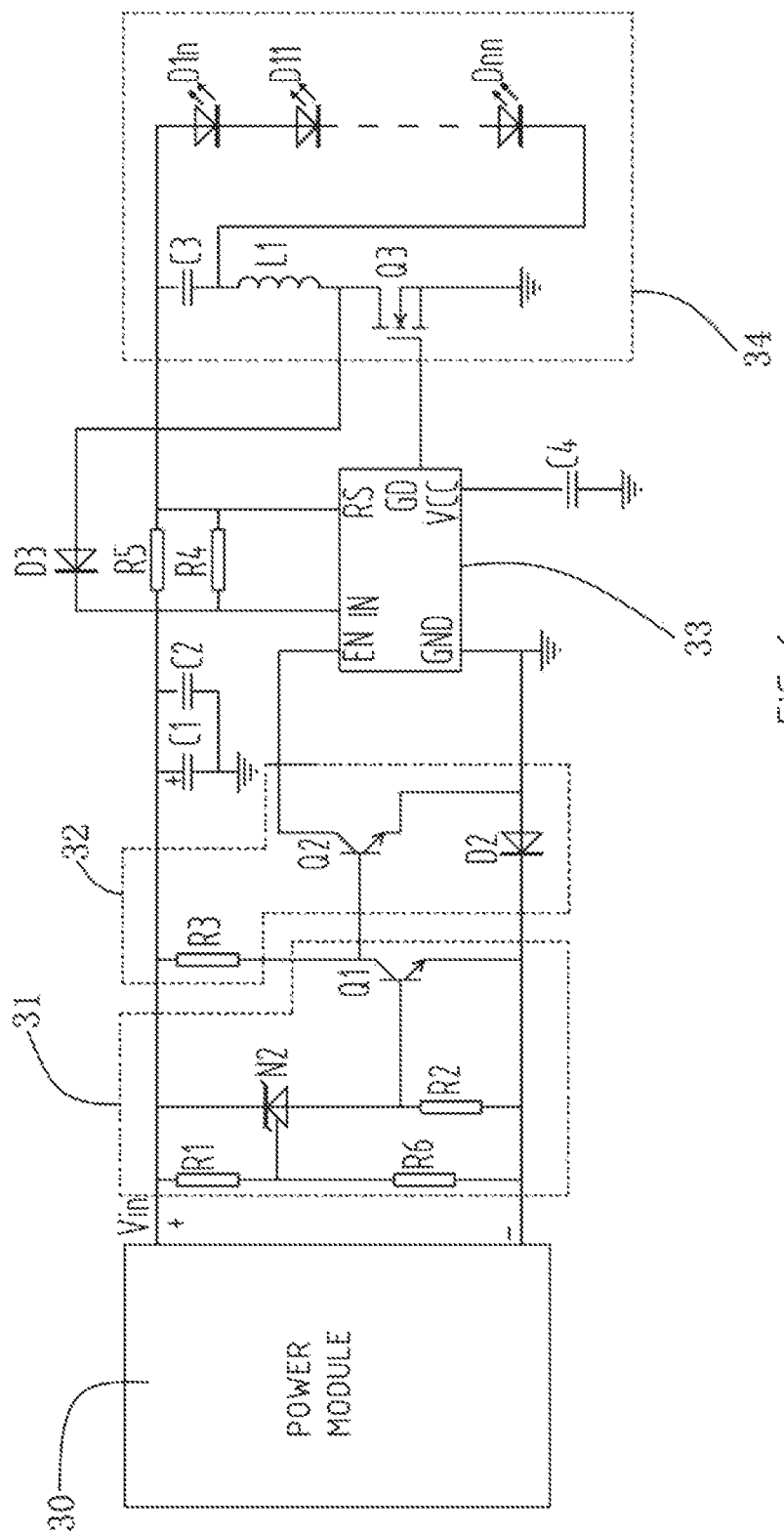
FIG. 6 is a circuit diagram of the undervoltage protection circuit for an LED lamp according to a third embodiment.

As shown in FIG. 6, a undervoltage protection circuit 300 for an LED lamp according to a third embodiment is presented. As presented in the first embodiment, the undervoltage protection 300 includes a power module 30, a controlling circuit module 31 electrically connected to the power module 30, an invert circuit 32 electrically connected to the controlling circuit module 31, a DC/DC converter 33 electrically connected to the invert circuit 32, and at least a load 34. The power module 30, the invert circuit 32, the DC/DC converter 33, and the load 34 have same configuration and principle of operation with that of the first embodiment. The configuration and principle of operation of the controlling circuit module 31 is described in detail as below.

As same as the controlling circuit module 11 of the first embodiment, the controlling circuit module 31 includes a signal collecting unit, a signal comparing unit, and a signal processing unit. The controlling circuit module 31 includes three resistors R1, R2, and R6, a controllable precision voltage source N2, and a triode Q1. In FIG. 6, the resistor R1, R6 is electrically connected in series and functions as the signal collecting unit. The controllable precision voltage source N2 is electrically connected in series to the resistor R2 and arranged in parallel with the resistors R1, R6. The REF of the controllable precision voltage source N2 is electrically arranged between the resistors R1, R6. The controllable precision voltage source N2 functions as the signal comparing unit. Whenever the voltage loaded on the resistor R2 is less than the reference voltage of the REF of the controllable precision voltage source N2, the controllable precision voltage source N2 turns off. Reversely, the controllable precision voltage source N2 turns on. The base of the triode Q1 is electrically arranged between the resistor R6 and the controllable precision voltage source N2. The emitter of the triode Q1 is grounded. The collector of the triode Q1 is electrically connected to the EN pin of the DC/DC converter 33. The triode Q1 functions as the signal processing unit and turns off when the controllable precision voltage source N2 is off. And then, the triode Q2 of the inverting circuit 32 breakover and the EN pin of the DC/DC converter 33 produces a low level. As a result, the load 14 does not work. Conversely, whenever the controllable precision voltage source N2 is on since the voltage of the resistor R2 is more than the reference voltage thereof, the triode Q2 breakdown and the EN pin of the DC/DC converter 33 produce a high level. The load 14 begins to work as a result.

Figure 7:
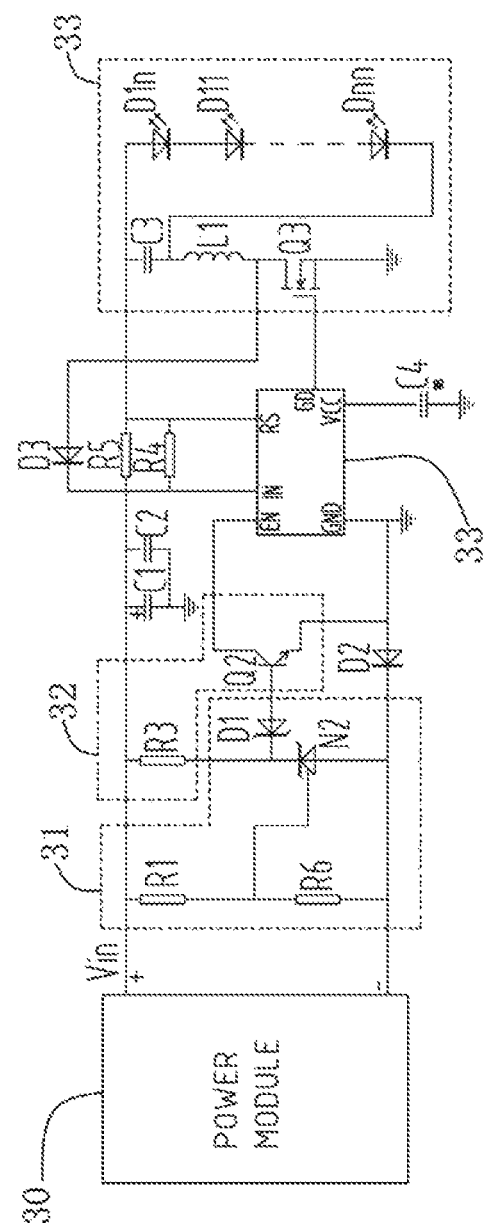
FIG. 7 is a circuit diagram of the undervoltage protection circuit for an LED lamp of FIG. 6 in which a voltage regulator tube replace a triode.

Referring to FIG. 7, a voltage-regulator tube D1 is used to replace the triode Q1 of the controlling circuit on base of the circuit shown on FIG. 6. The anode of the voltage-regulator tube D1 is electrically connected to the anode of the controllable precision voltage source N2, and the cathode of the voltage-regulator tube D1 is electrically connected to the EN pin of the DC/DC converter 33.

Figure 8:
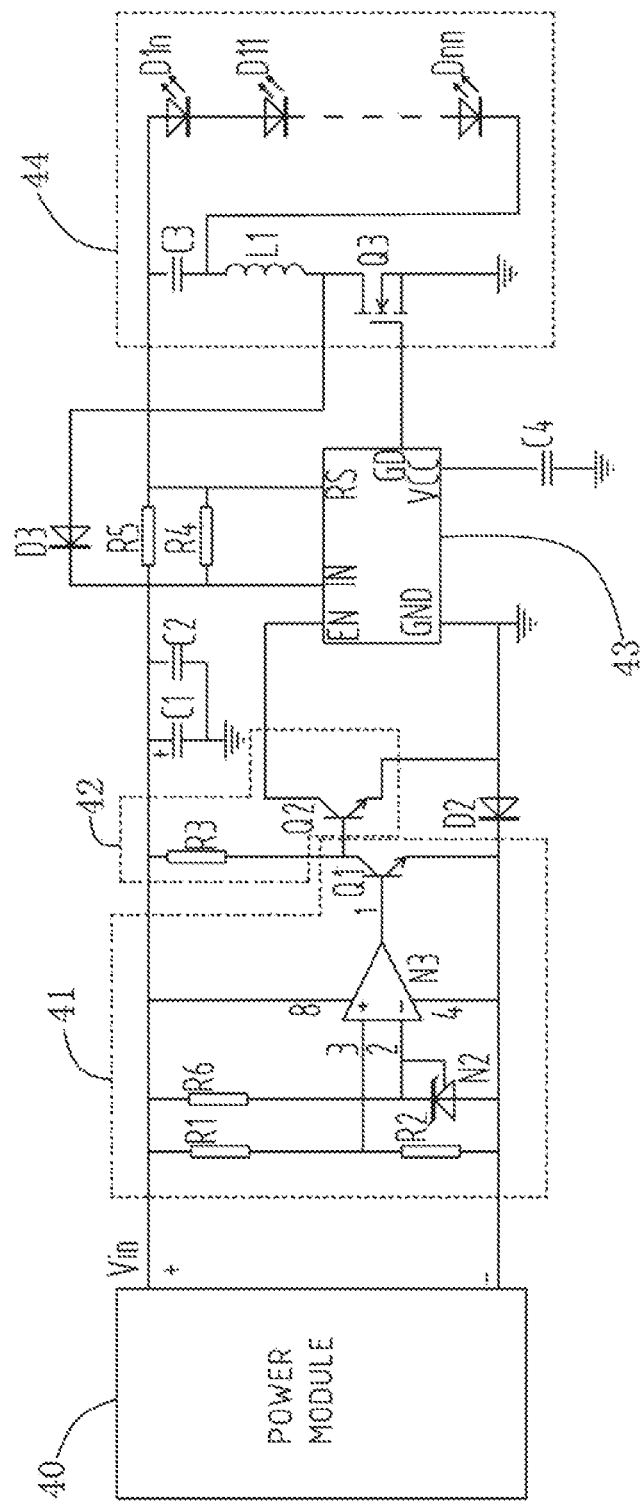
FIG. 8 is a circuit diagram of an undervoltage protection circuit for an LED lamp according to a fourth embodiment.

As shown in FIG. 8, a undervoltage protection circuit 400 for an LED lamp according to a third embodiment is presented. As described in the first embodiment, the undervoltage protection 400 includes a power module 40, a controlling circuit module 41 electrically connected to the power module 40, an invert circuit 42 electrically connected to the controlling circuit module 41, a DC/DC converter 43 electrically connected to the invert circuit 42, and at least a load 44. The power module 40, the invert circuit 42, the DC/DC converter 43, and the load 44 have same configuration and principle of operation with that of the first embodiment. The configuration and principle of operation of the controlling circuit module 41 is described in detail as below.

As same as the controlling circuit module 11 of the first embodiment, the controlling circuit module 41 includes a signal collecting unit, a signal comparing unit, and a signal processing unit. The controlling circuit module 41 includes three resistors R1, R2, R6, a controllable precision voltage source N2, an operation amplifier N3A, and a triode Q1. The resistor R1 and R6 is electrically connected in series each other and functions as the signal collecting unit. As described in the first embodiment, voltage value between the resistors R1, R2 can be respectively collected by means of selecting the resistors R1, R2 having different parameters. As the output voltage of the power module 40 raises, voltage value of the resistors R1, R2 will change. The voltage value loaded on the resistors R2 is regarded as a predetermined value and a reference voltage (VREF) which determines switching time of the controllable precision voltage source N2. The controllable precision voltage source N2 is electrically connected in series to the resistor R6 and in parallel to the resistors R1, R6. The REF of the controllable precision voltage source N2 is electrically connected to the inverting input of the operation amplifier N3A. The noninverting input of the operation amplifier N3A is electrically arranged between the controllable precision voltage source N2 and the resistor R6. The operation amplifier N3 has an output end electrically connected to the base of the triode Q1 and functions as the signal comparing unit. The emitter of the triode Q1 is grounded and the collector thereof is electrically connected to the EN pin of the DC/DC converter 43. The triode Q1 is used for the signal processing unit. The principle of operation is described in detail as follow. Whenever the voltage output of the power module 10, indicating an undervoltage condition, is less than the threshold voltage of the whole circuit, the reference voltage of the controllable precision voltage source 3 is less than 2.5V by means of selecting the resistors R1 and R2. The operation amplifier N3A produces a low level, which results that the triode Q2 of the inverting circuit 42 breakover. As a result, the EN pin of the DC/DC converter 43 drops to a low level and the load 14 does not work. Conversely, whenever the voltage output is more than the threshold voltage of the whole circuit, the EN pin of the DC/DC converter 43 produces a high level. The load 14 begins to work as a result.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An undervoltage protection circuit for an LED lamp comprising:
    a DC/DC converter connected to a power module, the DC/DC converter having an enable EN pin;
    a controlling circuit module electrically connected to the DC/DC converter, the controlling circuit module comprising:
    a signal collecting unit configured for collecting an input signal from the power module;
    a signal comparing unit electrically connected to the signal collecting unit, the signal comparing unit generates a first output voltage based on comparison of the input signal with a threshold voltage;
    an inverting circuit having an output connecting to the enable EN pin of the DC/DC converter; and
    a signal processing unit electrically connected to the signal comparing unit, the signal processing unit generating a second output signal, the second output signal connecting, through the inverting circuit, to the enable EN pin of the DC/DC converter, the second output signal turns on or turns off the DC/DC converter based on to the first output voltage from the signal comparing unit, wherein the controlling circuit module comprises two resistors R1, R2 in series and a triode Q1, a base of the triode Q1 is electrically connected between the resistors R1, R2, a collector of the triode Q1 is electrically connected to the EN pin of the DC/DC converter, an emitter of the triode Q1 is ground.

2. The undervoltage protection circuit for an LED lamp of claim 1, wherein the signal collecting unit collecting the input signal from the power module further comprises collecting an output voltage value of the power module.

3. An undervoltage protection circuit for an LED lamp comprising:
   a DC/DC converter connected to a power module, the DC/DC converter having an enable EN pin;
   a controlling circuit module electrically connected to the DC/DC converter, the controlling circuit module comprising:
   a signal collecting unit configured for collecting an input signal from the power module;
   a signal comparing unit electrically connected to the signal collecting unit, the signal comparing unit generates a first output voltage based on comparison of the input signal with a threshold voltage; and
   a signal processing unit electrically connected to the signal comparing unit, the signal processing unit generating a second output signal to the enable EN pin of the DC/DC converter, the second output signal turns on or turns off the DC/DC converter based on the first output voltage from the signal comparing unit, wherein the controlling circuit module comprises a voltage-regulator tube D1, and a triode Q1, a base of the triode Q1 is directly connected to a cathode of the voltage-regulator tube D1, a collector of the triode Q1 is electrically connected to the EN pin of the DC/DC converter, and an emitter of the triode Q1 is ground.

4. The undervoltage protection circuit for an LED lamp of claim 3, wherein the controlling circuit module further comprises a resistor R2, the resistor R2 is in series with the voltage-regulator tube D1 and electrically connected to the anode of the voltage-regulator tube D1, the base of the triode Q1 is electrically connected between the voltage-regulator tube D1 and the resistor R2.

5. The undervoltage protection circuit for an LED lamp of claim 4, wherein the controlling circuit module further comprises a resistor R6, the resistor R6 is in parallel with the voltage-regulator tube D1 and the resistor R2.

6. An undervoltage protection circuit for an LED lamp comprising:
   a DC/DC converter connected to a power module, the DC/DC converter having an enable EN pin;
   a controlling circuit module electrically connected to the DC/DC converter, the controlling circuit module comprising:
   a signal collecting unit configured for collecting an input signal from the power module;
   a signal comparing unit electrically connected to the signal collecting unit, the signal comparing unit generates a first output voltage based on comparison of the input signal with a threshold voltage;
   an inverting circuit having an output connecting to the enable EN pin of the DC/DC converter; and
   a signal processing unit electrically connected to the signal comparing unit, the signal processing unit generating a second output signal, the second output signal connecting, through the inverting circuit, to the enable EN pin of the DC/DC converter, the second output signal turns on or turns off the DC/DC converter based on the first output voltage from the signal comparing unit, wherein the controlling circuit module comprises three resistors R1, R2, R6, a controllable precision voltage source N2, and a triode Q1, the resistor R1 is in series with the resistor R6, the controllable precision voltage source N2 is electrically connected in series to the resistor R2 and is electrically connected in parallel with the resistors R1, R6, the base of the triode Q1 is electrically connected between the resistor R2 and the controllable precision voltage source N2, the emitter of the triode Q1 is ground, the collector of the triode Q1 is connected, through the inverting circuit, to the EN pin of the DC/DC converter.

7. An undervoltage protection circuit for an LED lamp comprising:
   a DC/DC converter connected to a power module, the DC/DC converter having an enable EN pin;
   a controlling circuit module electrically connected to the DC/DC converter, the controlling circuit module comprising:
   a signal collecting unit configured for collecting an input signal from the power module;
   a signal comparing unit electrically connected to the signal collecting unit, the signal comparing unit generates a first output voltage based on comparison of the input signal with a threshold voltage;
   an inverting circuit having an output connecting to the enable EN pin of the DC/DC converter; and
   a signal processing unit electrically connected to the signal comparing unit, the signal processing unit generating a second output signal, the second output signal connecting, through the inverting circuit, to the enable EN pin of the DC/DC converter, the second output signal turns on or turns off the DC/DC converter based on the first output voltage from the signal comparing unit, wherein the controlling circuit module comprises two resistors R1, R6, a controllable precision voltage source N2, and a voltage-regulator tube D1, the resistor R1 is electrically connected in series to the resistor R6 and in parallel to the controllable precision voltage source N2, the anode of the voltage-regulator tube D1 is electrically connected to that of the controllable precision voltage source N2, the cathode of the voltage-regulator tube D1 is electrically connected, through the inverting circuit, to the EN pin of the DC/DC converter.

8. An undervoltage protection circuit for an LED lamp comprising:
   a DC/DC converter connected to a power module, the DC/DC converter having an enable EN pin;
   a controlling circuit module electrically connected to the DC/DC converter, the controlling circuit module comprising:
   a signal collecting unit configured for collecting an input signal from the power module;
   a signal comparing unit electrically connected to the signal collecting unit, the signal comparing unit generates a first output voltage based on comparison of the input signal with a threshold voltage; and
   a signal processing unit electrically connected to the signal comparing unit, the signal processing unit generating a second output signal to the enable EN pin of the DC/DC converter, the second output signal turns on or turns off the DC/DC converter based on the first output voltage from the signal comparing unit, wherein the controlling circuit module comprises three resistors R1, R2, R6, a controllable precision voltage source N2, an operation amplifier N3, and a triode Q1, the resistor R1 is electrically connected in series to the resistor R2, the controllable precision voltage source N2 is electrically connected in series to the resistor R6 and in parallel to the resistors R1, R6, a REF input of the controllable precision voltage source N2 is electrically connected to an inverting input of the operation amplifier N3, a noninverting input of the operation amplifier N3 is electrically connected between the resistor R1 and resistor R2, an inverting input of the operation amplifier N3 is electrically connected between the controllable precision voltage source N2 and the resistor R6, an output of the operation amplifier N3 is electrically connected to the base of the triode Q1, an emitter of the triode Q1 is ground, a collector of the triode Q1 is electrically connected to an EN pin of the DC/DC converter.

* * * * *